Aug. 6, 1963                 E. P. STUCKA                    3,100,079
         PNEUMATIC THERMOSTAT WITH PRESSURE COMPENSATED VALVING
                         Filed April 7, 1961

INVENTOR.
EDWARD P. STUCKA
BY Joseph E. Ryan
ATTORNEY

United States Patent Office 3,100,079
Patented Aug. 6, 1963

3,100,079
PNEUMATIC THERMOSTAT WITH PRESSURE COMPENSATED VALVING
Edward P. Stucka, Deerfield, Ill., assignor to Minneapolis-Honeywell Regulator Company, Minneapolis, Minn., a corporation of Delaware
Filed Apr. 7, 1961, Ser. No. 101,456
12 Claims. (Cl. 236—87)

This invention relates to a pressure compensated, non-bleed, pneumatic condition controller or thermostat. In an apparatus of this type, the valving incorporated in the control normally presents a problem in differential and deadspot due to the effect of pressure differentials on the respective sides of the valves. Further, the apparatus is subject to line pressure variation which varies the operating characteristics of the same. The present invention is directed to an improved pressure compensated, non-bleed type control or thermostat which includes provision for compensating for the pressure differential between the inlet exhaust and branch sides of the respective valving and includes further provision for compensation at the inlet valve for inlet pressure variation. In addition, the apparatus includes an improved arrangement for feedback to improve operating differential. Therefore, it is an object of this invention to provide an improved pressure compensated, non-bleed type control. Another object of this invention is to provide the control of this type with line pressure compensation built into the device. A still further object of this invention is to provide in a non-bleed type control an improved arrangement for substantially eliminating deadspot in the valving. A still further object of this invention is to provide an improved control or thermostate structure in a pressure compensated, non-bleed thermostat. These and other objects of this invention will become apparent from the reading of the attached description wherein:

Figure 1:
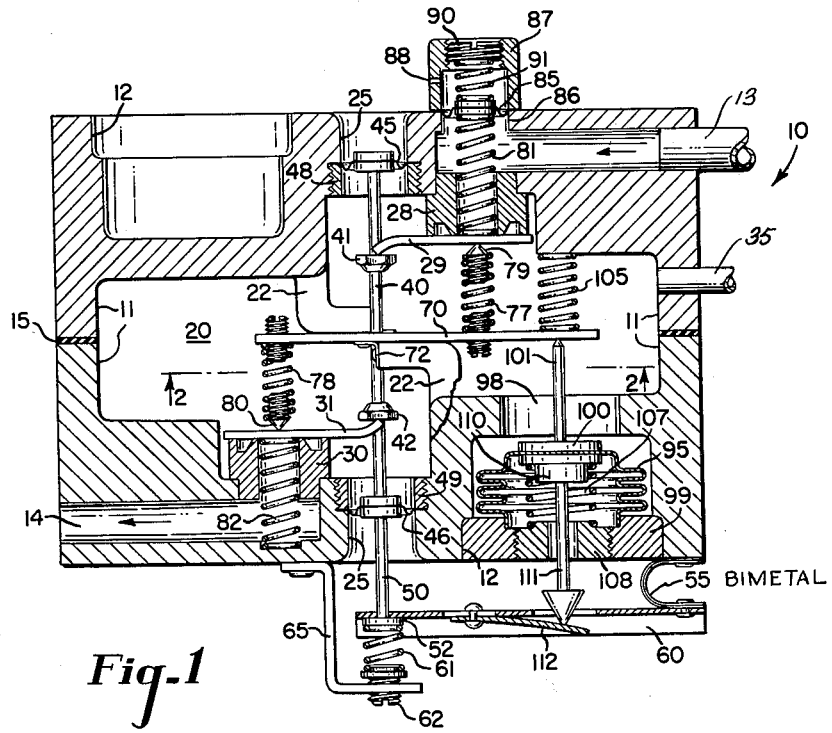
FIGURE 1 is a sectional view of the improved non-bleed thermostat.

My improved non-bleed pneumatic control or thermostat is shown in FIGURE 1 as including a two part casing member, indicated generally at 10, each part being symmetrical in form and having a general recess 11 on one surface thereof, a second recess 12, and passages or ports 13, 14 respectively, included therein. These casing parts are fitted together with a seal member 15 in between and suitably secured to one another through means (not shown) to provide a centrally located chamber 20 within the casing. In assembly the parts are reversed so that the passages and the recesses 12 are positioned on opposite surfaces for purposes which will be later noted. Projecting into the recess 11 in each casing part is an L-shaped flange section 22 and also included in each casing part is an aperture 25 which apertures and flanges align as will be later noted. The pressure chamber 20 connects with the extremities of the passages 13 and 14, which as will be later noted, represent the inlet and exhaust passages for the control. At the extremities of the passages 13, 14 are positioned nozzle members 28, 30 having, cooperating therewith, flapper members 29 and 31 respectively. The nozzle flapper combinations 28, 29 and 30, 31 define valves in which the nozzles are the valve seats and the flappers the movable valve members with the nozzles being suitably positioned into the casting and communicating with the respective passages 13, 14 being suitably secured thereto. These valves control a flow of air into and out of the chamber 20 in the casing and in addition one of the casing parts has drilled therethrough a third passage member indicated generally at 35 which passage represents the branch outlet from the control device or through which the control branch pressure within the chamber 20 is communicated to the apparatus to be controlled. Although not shown it will be recognized that suitable conduit or piping will be connected to the passage 35 permitting flow of control air to the device to be operated.

The flapper portions 29 and 31 are adapted to rock on the respective nozzles 28 and 30 to perform the valving operation, and the flappers, or movable valve members, are actuated by an operating shaft 40 having a pair of thrust nuts 41, 42 mounted thereon which nuts engage the respective ends of the lever to perform this rocking operation when the shaft is moved. The shaft 40 is mounted within the casing 10 by means of a pair of diaphragm members 45, 46 which are positioned in the small apertures 25 in the casing halves, the diaphragms being secured to the casing halves and to the shaft through suitable means such as clamping means indicated at 48, 49 respectively. These clamping means are suitably secured to the casing and shaft in a conventional manner. Thus the shaft 40 is mounted for movement across the pressure chamber 20 within the casing and one extremity of the shaft indicated at 50 extends beyond the casing and the chamber for purposes to be later noted.

Mounted on one of the casing elements external of said pressure chamber is the thermal element or curved bimetal 55 which is suitably secured at one extremity to the casing and mounts at its other extremity a lever member 60. While I have shown a curved bimetal as the condition sensor, it may be recognized that this may take other forms. The lever member 60 extends on the casing 10 and engages the extremity of the shaft 40 at the extension 50 such that the extension of the shaft extends through an aperture in the free extremity of the lever where it terminates in a flange portion 52 providing a driving connection for the shaft from the lever 60 and bimetal 55. The set point adjustment means for the thermostat is included with the lever, the set point adjustment means comprising a spring 61 abutting an adjusting screw 62 mounted in a flange 65 attached to the casing. The opposite extremity of the spring 61 bears against the flange 52 of the shaft such that the operating shaft 40 will follow the movement of the lever 60 and hence the bimetal or condition responsive means 55 with variation in the condition to which the responsive means responds. Thus adjustment of the screw 62 would change the bias on the lever 60 to cause movement of the shaft 40 to a particular position against the torsional output from the condition sensor or bimetal 55 to set the operating position for the thermostat or controller by cracking one or the other of the valve flappers and adjusting the pressure within the chamber 20.

Figure 2:
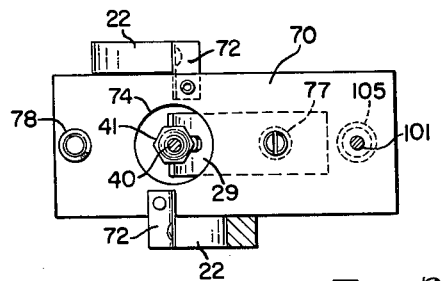
FIGURE 2 is a sectional view of a portion of the thermostat taken along the line 22 in FIGURE 1, and FIGURE 3a and FIGURE 3b are diagrammatic sections of portions of the thermostat showing another embodiment of the invention.

In this type of non-bleed control device the problem has always existed in pneumatic valving called deadspot. This is the condition requiring a certain amount of controlled movement imparted to the valving mechanism before the valves take effect to open or close respectively. Positioned within the chamber 20 is a flat lever plate 70 which is secured midway along its extent to the brackets 22 of the recesses 11 for the casing halves of the casing 10. The lever is secured to the brackets 22 by means of flexible angle plates 72 which are secured respectively to the brackets and to the edge of the plate or lever 70 to permit slight movement of the same. As indicated in FIGURE 2, the lever 70 has an aperture 74 therein through which the shaft 40 extends so that no physical engagement exists between the shaft and the lever. The lever 70 mounts near its extremities bias springs 77, 78 for the valves of the inlet and exhaust passages 13, 14 with one extremity of each of the springs being secured to the lever and the opposite extremity of each spring resting through a thrust cone 79, 80 against the respective flappers to bias the same toward the closed position. On the opposite side of the respective levers and in the nozzles 28, 30 respectively are springs 81, 82 which bear against the under surface of the flappers and rest respectively against the casing and the diaphragm to be later described. The spring rates of the springs 77, 78, 81 and 82 will be determined by the area size of the nozzles 28 and 30 and the pressures in the inlet, outlet and exhaust passages as will be later described. Thus the springs 77, 81 apply bias on opposite sides of said lever to adjust the force on the same while the springs 78, 82 similarly apply force on the lever 31 to adjust the force required to crack the same. In this manner the deadspot or deadband is substantially eliminated. As will be hereinafter noted, this force is kept constant with pressure variations at the outlet and inlet. The inlet passage 13 which houses the nozzle 28 and the spring 81 includes in addition a small diaphragm 85 positioned across an aperture 86 opposite the nozzle and over which a housing 87 is positioned and suitably secured through means not shown. The housing 87 is vented as at 88 and includes a threaded plug 90 which serves as an adjustment for a shpring 91 backing up the opposite side of the diaphragm 85 to provide main line compensation or inlet compensation for the control device. Thus with variation in inlet pressure, the diaphragm 85 will respond against the pressure of the spring 91 and as controlled by the setting plug 92 to vary the end position of the spring 81 bearing against the same and hence vary the bias on the under surface of the flapper 29 as will be more fully described hereinafter.

Thus it will be seen that the pressure on the flappers 29, 31 of the valves is determined by the pressure within the chamber 20 and the pressure in the other side of the flappers which will be inlet pressure and at atmosphere or exhaust pressure respectively. Since the flapper 29 will have the greatest pressure under the same or in the nozzle since it is exposed to the inlet passage 13, spring 81 under the flapper will be the smallest or have the least spring rate. This spring rate together with the size of the area within the nozzle and under the flapper will establish a force acting against the undersurface of the flapper which will be just slightly exceeded by the force on top of this flapper which is determined by the area size of the nozzle, the pressure within the chamber 20 and the spring rate of the spring 77. In this manner, positive closure or sealoff of the valve flapper 29 against nozzle 28 is provided. The spring rate of spring 77 substantially exceeds the spring rate of spring 81 within the nozzle. On the outlet side of the control device, the valve formed by the flapper 31 and nozzle 30 is also similarly biased. Since the underside of the flapper has atmospheric pressure therein the spring 82 will have an appreciably larger spring rate than the spring 81. This spring will establish a force against the flapper which will be constant and which will be aided by whatever force is available from the exhaust or atmospheric pressure operating against the undersurface of the nozzle. In most cases this pressure will be insignificant. On the upper side of the flapper, the area of the nozzle and the pressure within the chamber 20 will establish one force against the upper surface of the nozzle which, together with the spring rate of spring 78, will be just slightly more than the force established by the spring 82 to provide sealoff of this valve but permit cracking with minimum movement of the shaft 40. It will be well recognized that the spring rates of the respective springs will be established for a particular operating range of the control device, that is to its inlet pressure, its outlet pressure range and the respective sizes of the nozzles. The springs 77, 78, 81 and 82 are normally sized for a given normal outlet pressure within the chamber 20. As will be hereinafter noted, this pressure will vary with operation of the control device and additional apparatus is provided for adjusting the rates of the springs by moving the ends of the same to compensate for the variation in pressure within the chamber 20 so that the pressure or force differential on the flappers will be held constant over a normal operating range of the device. This will provide a normal deadband for the control apparatus or the valves of the same and maintain this deadband constant over the operating range of the apparatus.

Also positioned within the casing in chamber 20 is a bellows member 95 which is located in the recess 12 of the lower casing half. A portion of the wall defining its recess has been removed such as at 98 to permit communication with the chamber 20. The bellows 95 and a mounting assembly 99 is suitably attached within the recess 12 and the bellows includes a thrust plate 100 having a thrust pin 101 attached thereto which bears against the free extremity of the lever or plate 70. Positioned opposite the thrust pin 101 in the casing 20 is a spring 105 which bears against the opposite surface of the lever and the casing to apply a bias to the lever insuring contact with the thrust plate pin 101 of the bellows 95. The bellows assembly is a feedback unit responding to the branch line pressure within the chamber 20. Positioned within the bellows is a bias spring 107 which rests against the spring support plate 108 to bias the bellows against the pressure within the chamber 20 in determining the extent of movement of the same. A second thrust plate 110 is positioned within the bellows and includes a thrust pin 111 bearing against the lever 60 or a throttling spring 112 adjustably positioned on the lever 60 to feed back against the lever 60 and hence the operating shaft 40 a signal in accordance with branch line pressure in chamber 20. Thus it will be seen that the pressure responsive means or feedback bellows 95 bears against the plate 70 carrying the adjusting springs 77, 78 for the flappers 29, 31. Rotation of the plate in a counter clockwise direction will increase the force on the bias springs 77, 78 and rotation in a clockwise direction will decrease the bias applied to the flappers to hold them on the nozzles. Thus the plate operates to adjust the bias on the flappers for purposes of maintaining the pressure compensation on the valves with a change in pressure in the chambers 20 by changing the forces applied to the springs 77, 78 on the respective flappers to compensate for the changes on the flappers produced by the pressure change in the chamber 20. The pressure responsive feedback means 95 also applies a force on the lever 60 which is connected to and transmits the movement of the condition responsive means or bimetal 55 to the operating shaft 40 for the flappers or the movable valve elements in a conventional manner. The deadspots is due in part to the pressure difference on either side of the control valves and a change or variation in this pressure differential. This deadband or deadspot is substantially reduced and controlled with pressure change in a manner to be described hereinafter. As an example of the type of operation of this improved control, let it be assumed that the inlet air pressure is at 15 p.s.i. and the branch pressure within the chamber 20 is at 10 p.s.i. Let it further be assumed that the areas of the nozzles 28, 30 with the pressures stated and the sizes of the springs 77, 78, 81 and 82 will produce the forces hereinafter stated. In addition let it be assumed that the effective lever arm of the plate 70 and the movement produced by the feedback bellows 95 with pressure change in chamber 20 will produce the changes in force to be hereinafter stated. To effectively reduce deadband or deadspot in the valving, the force differential on the flappers, that is the force holding the flapper on the nozzle for sealoff will be held to a minimum such that movement of the shaft from the sensing element sufficient to crack the respective valves will require only a small change in the condition sensed by the sensor. With a 15 p.s.i. inlet pressure previously assumed and considering the same to be held constant, the force under the flapper 29 will be assumed to be 15 lbs. Spring 81 also positioned under the flapper will be sized to produce an additional force of 3 lbs. for compensation purposes which force will be held relatively fixed except for the effect of pressure variation at the inlet which will be further discussed later. To effect a force differential on flapper 29 sufficient to provide positive sealoff, spring 77 will normally be sized to produce a 9 lb. force on the flapper tending to close the same when the branch line pressure within the chamber is 10 p.s.i. and assuming that this pressure would produce a 10 lb. force on the flapper. This would provide a force differential of 1 lb. of flapper 29 in the closing direction sufficient for sealoff which force is held at a minimum to permit ease in opening the valve. A similar sizing of springs would be present at the exhaust valving side of the control device. Thus, the spring 82 would be sized to produce, for example, an 18 lb. force on the underside of the flapper 31 while the spring 78 would normally produce a 9 lb. force on the upper side of the flapper which together with the pressure in the chamber 20 would add an additional 10 lb. force giving a 1 lb. differential in the closing or sealoff direction of the exhaust valving. The 10 p.s.i. assumed here would be a branch outlet pressure for a normal set point condition of the condition sensor or bimetal 55 and it will be noted that the operating shaft 40 when it is moved by the sensor in one direction or the other will operate on one valve only so that it will have to overcome only the 1 lb. force differential to open either of the valves. In this manner the deadband or deadspot in the valving is substantially reduced. The problem of maintaining this differential with pressure variation in chamber 20 is accomplished through the effect of the feedback bellows 95 operating on the plate 70 which will adjust the spring rates or forces from the springs 77, 78 on the flappers 29, 31. Thus with movement of the shaft 40 responding to a change in condition sensed by the sensor 55, the branch pressure in chamber 20 will change with the opening of one or the other of the inlet or exhaust valves. Assuming that this operation effects an opening of the inlet valve to increase branch pressure to 12 p.s.i., the forces on both of the flappers will now be increased by 2 lbs. in a direction which would tend to increase the force differential on the respective valving in the closing direction. However the feedback bellows responding to this increase in pressure in chamber 20 would be collapsed causing movement of the plate 70 in a clockwise direction, as seen in FIGURE 1, tending to unload the springs 77, 78. It will be assumed that the movement of the bellows 95 in response to this pressure change in chamber 20 will be sufficient to act on the respective springs to effect a 2 lb. decrease in the respective forces to counterbalance the force change effected by the pressure increase in the chamber. Thus the force differential on both of the flappers will be maintained at the 1 lb. level maintaining the deadband previously described. Operation of the sensor in the opposite direction to open the exhaust valve and decrease the branch line pressure in chamber 20 will produce the same effect in the opposite manner. Thus a drop in pressure of 2 lbs. in the chamber 20 will be sensed by the bellows 95 in the same manner and will provide a 2 lb. increase in the force applied to the flappers in the direction to seal off the valving. This drop in pressure sensed by the bellows 95 will permit the bellows to expand under the influence of its spring 110 to rotate the plate 70 in a counterclockwise direction, as seen in FIGURE 1, tending to increase the loading on the springs 77, 78 to a degree that the 2 lb. force drop experienced by reduction in pressure change in chamber 20 is made up by the increase in force provided by the springs 77 and 78 with movement of plate 70 to maintain the 1 lb. force differential on the flappers 29, 31. The spring 105 merely insures contact of thrust pin 101 and the lever 70 and can be omitted if desired.

The feedback bellows 95, as previously stated, applies a conventional force to the sensing lever 60 or the lever attached to the condition responsive means 55 and tends to vary the bias or loading on the lever causing movement of the shaft 40 and the respective flappers connected thereto. It will be noted that the connection between the flappers and the shaft 40 is not positive but rather one in which the shaft on upward movement will pivot lever 28 upon engagement of the stop nut 41 with the lever 28, while the flapper 31 will remain fixed as the nut 42 moves away from the end of the flapper 31. Similarly downward movement of the shaft will permit the lever 29 to rock back on the nozzle 28 until the nut 41 moves away from the flapper and the nut 42 engages the flapper 31 to rock it on its associated nozzle 30, opening the exhaust port. In addition, the feedback force will be imparted to the plate 70 in a manner to vary the loading on one or the other of the springs applied to the flappers. This variation or change in bias will be in proportion to the branch line pressure to compensate for the difference between main, branch and exhaust pressures in passages 13, 14 and chamber 20. Variation in the feedback or branch line pressure also is applied directly to the lever to pivot the lever 60 and unloads its spring in accordance with this pressure differential applied to the feedback bellows.

In addition, the inlet valve formed by flapper 29 and nozzle 28 is compensated, or has the spring thereunder compensated, to adjust for variation in the inlet pressure supplied to the control. The small diaphragm 85 within the housing 87 responds to the variation in inlet or supply pressure which acts against the spring 91 to position the end of the spring 81 which is positioned within the nozzle and under the flapper to permit this adjustment. A similar spring 82 positioned in the nozzle 30 balances the effect of the spring 81 so that similar spring units can be employed.

In operation, the condition responsive device or bimetal will adjust the position of the lever and hence the operating shaft 40 to vary the position of the respective flappers 29, 31 on the nozzles 28, 30 to vary the pressure within the chamber 20 and hence pressure flow through the branch line or control output conduit 35 to the device to be controlled. With the variation in branch line pressure or the pressure within the chamber 20 the pressure responsive means or feedback bellows will apply a thrust both to the operating lever 40 through the throttling adjusting spring 112 to vary the effect on the lever movement and on the flappers in a conventional manner. Throttling is obtained by adjusting the ratio of force imparted to the lever 60 and hence the shaft 40. The spring plate or leaf spring 112 is adjustably positioned on the lever to affect this throttling adjustment. Similarly the adjustment mechanism or screw 62 varies the position of the spring 61 to vary the force and hence the setting of the lever 60 to adjust the set point of the control device in the conventional manner.

Figure 3A:
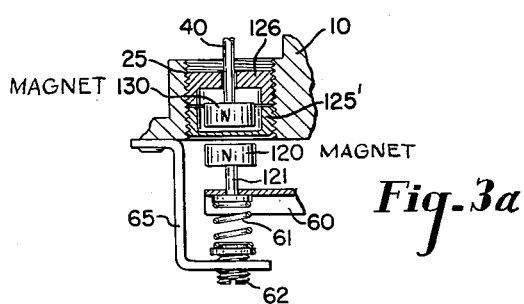
Figure 3B:
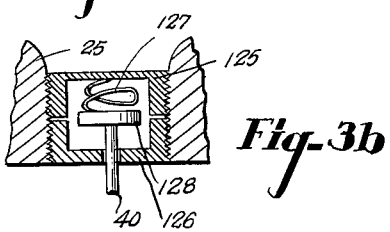

The embodiment of the invention shown in FIGURES 3a and 3b is basically the same as that shown in FIGURE 1 and hence only a portion of the apparatus is shown, it being understood that the remaining details will take the form as shown in FIGURE 1. Thus, for simplicity, only the changes in the embodiment which differ from that of FIGURE 1 will be described herein and the operation will be substantially identical with that of the embodiment of FIGURES 1 and 2. These changes as indicated in FIGURES 3a and 3b involve merely the connection between the sensing lever 60 and the operating shaft 40 of the thermostatic control device and a special mounting of the shaft 40. As will be seen in FIGURE 3a, the lever 60 mounts a magnet 120 thereon in the same type of connection as the portion 50 of the operating shaft was previously connected to the lever. The setting spring and adjusting screw 61 and 62 respectively bear against the end of the mounting pin 121 for the magnet such that the lever will move the magnet relative to the casing. In this embodiment the casing is sealed at the apertures 25 with a thin wall permitting more accurate sealing of the structure and elimination of additional cavities in the casing parts. The operating force from the lever 60 is imparted to the shaft which in this embodiment mounts a magnet 130 and is journaled into a mounting plug 125 and sleeve 126 positioned in the aperture 25 in place of the diaphragm 46. A similar mounting plug, shown in FIGURE 3b, positions the opposite end of the shaft 40 which is also guided through a guide sleeve 126 positioned by plug 125 and includes a bias spring 127 acting against a spring retaining plug 128 on the end of the shaft 40 for positioning the magnet 130 with respect to the magnet 120 on the shaft 60 to provide the magnetic driving effect to be described hereinafter. The magnet 130 on the shaft 40 is positioned adjacent the lever 60 and is similarly poled to the magnet 120. That is, like poles of the magnets 120, 130 are placed in adjacent relationship to obtain a repelling effect therebetween and produce a magnetic driving effect between the lever 60 and shaft 40. Thus the repulsion or action of the flux lines from the similarly poled ends of the magnet will cause the shaft 40 to slide within the mounting plugs 126 in either side of the casing to position the flappers associated with the nozzles for the valving of the control device. The shaft in this embodiment carries the same nuts or thrust members 41, 42 which engage the flappers and the shaft again passes through the aperture 74 in the lever 70. This arrangement permits isolation of the condition responsive element and its adjusting mechanism from the interior or pressure chamber of the control device eliminating the needs for seals and providing a positive magnetic driving connection between the shaft and the lever. In operation this embodiment is identical with that of the preceding embodiment varying therefrom only in the means for imparting movement to the lever or the connection of the lever 60 to the operating shaft.

In considering this invention it should be remembered that the present disclosure is illustrative only in that the scope of the invention should be determined only by the appended claims.

I claim as my invention:

1. A pneumatic non-bleed thermostat comprising: a casing having a pressure chamber therein; inlet, exhaust and branch line passages positioned within said casing; nozzle means positioned in said inlet and exhaust passages adjacent said chamber; flapper means associated with said nozzle means; an operating shaft movably mounted within said chamber of said casing, said shaft engaging said flapper means and adapted to selectively pivot one or the other of the flapper means relative to said nozzle to open and close selectively said inlet and exhaust passages to said chamber; a bimetal mounted on said casing; lever means connected to and movable by said bimetal; means connecting said lever means to said shaft to position said shaft in accordance with movement of said bimetal; bellows feedback means positioned in part in said chamber end engaging said lever means to apply a feedback force to said lever means; second lever means positioned within said chamber and pivotally connected to said casing; biasing means being applied to each of said flapper means to offset the force on said flapper means applied by the pressure of said inlet, exhaust and branch passages to produce a predetermined minimum force difference on said flapper means, said biasing means being connected in part to said second lever means and each of said flapper means; and means connecting said bellows means to said second lever means to vary the loading of said biasing means on said flapper means with a variation in branch line pressure within said chamber to maintain said predetermined force difference on said flapper means.

2. A pneumatic non-bleed thermostat comprising: a casing having a pressure chamber therein; inlet, exhaust and branch line passages positioned within said casing; nozzle means positioned in said inlet and exhaust passages adjacent said chamber; flapper means associated with said nozzle means; an operating shaft movably mounted within said chamber of said casing, said shaft engaging said flapper means and adapted to selectively pivot one or the other of the flapper means relative to said nozzle to open and close selectively said inlet and exhaust passages to said chamber; a bimetal mounted on said casing external of said sealed chamber; lever means connected to and movable by said bimetal; means connecting said lever means to said shaft to position said shaft in accordance with movement of said bimetal; bellows feedback means positioned in part in said chamber and engaging said lever means to apply a feedback force to said lever means; second lever means positioned within said chamber and pivotally connected to said casing; biasing means being applied to each of said flapper means to offset the force on said flapper means applied by the pressure of said inlet, exhaust and branch passages to produce a predetermined minimum force difference on said flapper means, said biasing means being connected in part to said second lever means; and means connecting said bellows means to said second lever means to vary the loading of said biasing means on said flapper means with a variation in branch line pressure within said chamber to maintain said predetermined force difference on said flapper means.

3. A pneumatic non-bleed control comprising: a casing having a pressure chamber therein; inlet, exhaust and branch line passages positioned within said casing; nozzle means positioned in said inlet and exhaust passages adjacent said chamber; flapper means associated with said nozzle means; an operating shaft movably mounted within said chamber of said casing, said shaft engaging said flapper means and adapted to selectively pivot one or the other of the flapper means relative to said nozzle to open and close selectively said inlet and exhaust passages to said chamber; a condition sensor mounted on said casing; lever means connected to and movable by said condition sensor; means connecting said lever means to said shaft to position said shaft in accordance with movement of said condition sensor; bellows feedback means positioned in part in said chamber and engaging said lever means to apply a force to said lever means; second lever means positioned within said chamber and pivotally connected to said casing; biasing means being applied to each of said flapper means to offset the force on said flapper means applied by the pressure of said inlet, exhaust and branch passages to produce a predetermined minimum force difference on said flapper means, said biasing means being connected in part to said second lever means; and means connecting said bellows means to said second lever means to vary the loading of said biasing means on said flapper means with a variation in branch line pressure within said chamber to maintain said predetermined force difference on said flapper means.

4. A pneumatic non-bleed thermostat comprising: a casing having a pressure chamber therein; inlet, exhaust and branch line passages positioned within said casing; valve means including a first part positioned in each of said inlet and exhaust passages adjacent said chamber, each of said valve means including a second movable part associated with said first part; an operating means movably mounted within said chamber of said casing, said operating means engaging said second parts and adapted to selectively move said second parts relative to said first parts to open and close selectively said inlet and exhaust passages to said chamber; a bimetal mounted on said casing; lever means connected to and movable by said bimetal; means connecting said lever means to said operating means to position said operating means in accordance with movement of said bimetal; bellows feedback means positioned in part in said chamber and engaging said lever means to apply a force to said lever means;

second lever means positioned within said chamber and pivotally connected to said casing; biasing means applied to each of said second parts of said valve means to offset the force on said second parts applied by the pressures at said inlet, exhaust and branch passages to produce a predetermined force difference on said second parts of said valve means, said biasing means for each of said second parts of said valve means being connected in part to said second lever means; and means connecting said bellows means to said second lever means to vary the loading of said biasing means on said second parts of said valve means with a variation in branch line pressure within said chamber to maintain said predetermined force difference on said second parts of said valve means.

5. A pneumatic non-bleed thermostat comprising: a casing having a pressure chamber therein; inlet, exhaust and branch line passages positioned within said casing; valve means including a first part positioned in each of said inlet and exhaust passages adjacent said chamber, each of said valve means including a second movable part associated with said first part; an operating means movably mounted within said chamber of said casing, said operating means engaging said second parts and adapted to selectively move said second parts relative to said first parts to open and close selectively said inlet and exhaust passages to said chamber; a bimetal mounted on said casing; lever means connected to and movable by said bimetal; means connecting said lever means to said operating means to position said operating means in accordance with movement of said bimetal; pressure responsive feedback means positioned in part in said chamber and engaging said lever means to apply a feedback force to said lever means; second lever means positioned within said chamber and pivotally connected to said casing; biasing means applied to each of said second parts of said valve means to offset the force on said second parts applied by the pressures at said inlet, exhaust and branch passages to produce a predetermined force difference on said second parts of said valve means, said biasing means for each of said second parts of said valve means being connected in part to said second lever means; and means connecting said pressure responsive means to said second lever means to vary the loading of said biasing means on said second parts of said valve means with a variation in branch line pressure within said chamber to maintain said predetermined force difference on said second parts of said valve means.

6. A pneumatic non-bleed thermostat comprising: a casing having a pressure chamber therein; inlet, exhaust and branch line passages positioned within said casing; nozzle means positioned in said inlet and exhaust passages adjacent said chamber; flapper means associated with said nozzle means; an operating shaft movably mounted within said chamber of said casing, said shaft engaging said flapper means and adapted to selectively pivot one or the other of the flapper means relative to said nozzle to open and close selectively said inlet and exhaust passages to said chamber; a bimetal mounted on said casing external of said sealed chamber; lever means connected to and movable by said bimetal; means connecting said lever means to said shaft to position said shaft in accordance with movement of said bimetal; bellows feedback means positioned in part in said chamber and engaging said lever means to apply a feedback force to said lever means; second lever means positioned within said chamber and pivotally connected to said casing; spring means applied to each of said flapper means to offset the force on said flapper means applied by the pressures of said inlet, exhaust and branch passages to produce a predetermined force difference on said flapper means, said spring means for each flapper means being connected in part to said second lever means; and means connecting said bellows means to said second lever means to vary the loading of said spring means on said flapper means with a variation in branch line pressure within said chamber to maintain said predetermined force difference on said second parts of said valve means.

7. A pneumatic non-bleed thermostat comprising: a casing having a pressure chamber therein; inlet, exhaust and branch line passages positioned within said casing; nozzle means positioned in said inlet and exhaust passages adjacent said chamber; flapper means associated with said nozzle means; first spring means positioned under said flapper means; an operating shaft movably mounted within said chamber of said casing, said shaft engaging said flapper means and adapted to selectively pivot one or the other of the flapper means relative to said nozzle to open and close selectively said inlet and exhaust passages to said chamber; a bimetal mounted on said casing; lever means connected to and movable by said bimetal; means connecting said lever means to said shaft to position said shaft in accordance with movement of said bimetal; bellows feedback means positioned in part in said chamber and engaging said lever means to apply a force to said lever means; second lever means positioned within said chamber and pivotally connected to said casing; second spring means positioned between said second lever means and each of said flapper means; said first and second spring means for each flapper means cooperating therewith to offset the force applied by the pressures at said inlet, exhaust and branch passages and produce a predetermined force difference on the respective flapper means; and means connecting said bellows means to said second lever means to vary the loading of said first and second spring means associated with said flapper means with variation in branch line pressure within said chamber to maintain said predetermined force difference on each of said flapper means.

8. A pneumatic non-bleed thermostat comprising: a casing having a pressure chamber therein; inlet, exhaust and branch line passages positioned within said casing; valve means including a first part positioned in each of said inlet and exhaust passages adjacent said chamber; each of said valve means including a second movable part associated with said first part; an operating means movably mounted within said chamber of said casing, said operating means engaging said second parts and adapted to selectively move said second parts relative to said first parts to open and close selectively said inlet and exhaust passages to said chamber; a bimetal mounted on said casing; lever means connected to and movable by said bimetal; means connecting said lever means to said operating means to position said operating means in accordance with movement of said bimetal; pressure responsive feedback means positioned in part in said chamber and engaging said lever means to apply a force to said lever means; means including biasing means applied to each of said second parts of said valve means to offset the force on said second parts applied by the pressures at said inlet, exhaust and branch passages to produce a predetermined force difference on said second parts of said valve means, said biasing means for each of said second parts of said valve means being connected in part to said second parts of said valve means; and means connecting said pressure responsive means to said last named means to vary the loading of said biasing means on said second parts of said valve means with a variation in branch line pressure within said chamber to maintain said predetermined force difference on said second parts of said valve means.

9. A pneumatic non-bleed thermostat comprising: a casing having a pressure chamber therein; inlet, exhaust and branch line passages positioned within said casing; nozzle means positioned in said inlet and exhaust passages adjacent said chamber; flapper means associated with said nozzle means; first spring means positioned under said flapper means; an operating shaft movably mounted within said chamber of said casing, said shaft engaging said flapper means and adapted to selectively pivot one or the other of the flapper means relative to said nozzle means to open and close selectively said inlet and exhaust passages to said chamber; a bimetal mounted on said casing; lever means connected to and movable by said bimetal; means connecting said lever means to said shaft to position said shaft in accordance with movement of said bimetal; bellows feedback means positioned in part in said chamber and engaging said lever means to apply a force to said lever means; second lever means positioned within said chamber and pivotally connected to said casing; second spring means positioned between said second lever means and each of said flapper means; said first and second spring means for each flapper means cooperating therewith to offset the force applied by the pressures at said inlet, exhaust and branch passages to produce a predetermined force difference on the respective flapper means; means connecting said bellows means to said second lever means to vary the loading of said first and second spring means associated with said flapper means with a variation in branch line pressure within said chamber to maintain said predetermined force difference on each of said flapper means; and a set point adjustable spring connected to said first named lever means.

10. A pneumatic non-bleed thermostat comprising: a casing having a pressure chamber therein; inlet, exhaust and branch line passages positioned within said casing; nozzle means positioned in said inlet and exhaust passages adjacent said chamber; flapper means associated with said nozzle means; first spring means positioned under said flapper means; an operating shaft movably mounted within said chamber of said casing, said shaft engaging said flapper means and adapted to selectively pivot one or the other of the flapper means relative to said nozzle means to open and close selectively said inlet and exhaust passages to said chamber; a bimetal mounted on said casing; lever means connected to and movable by said bimetal; means connecting said lever means to said shaft to position said shaft in accordance with movement of said bimetal; bellows feedback means positioned in part in said chamber and engaging said lever means to apply a force to said lever means; second lever means positioned within said chamber and pivotally connected to said casing; second spring means positioned between said second lever means and each of said flapper means; said first and second spring means for each flapper means cooperating therewith to offset the force applied by the pressures at said inlet, exhaust and branch passages to produce a predetermined force difference on the respective flapper means; means connecting said bellows means to said second lever means to vary the loading of said first and second spring means associated with said flapper means with variation in branch line pressure within said chamber to maintain said predetermined force difference on each of said flapper means; and pressure responsive means positioned in said inlet passage and connected to said first spring means under said flapper means at said inlet passage, said pressure responsive means including a diaphragm and spring being responsive to inlet pressures and adapted to change the bias of said spring means connected thereto.

11. A pneumatic non-bleed thermostat comprising: a casing having a pressure chamber therein; inlet, exhaust and branch line passages positioned within said casing; nozzle means positioned in said inlet and exhaust passages adjacent said chamber; flapper means associated with said nozzle means; first spring means positioned under said flapper means; an operating shaft movably mounted within said chamber of said casing, said shaft engaging said flapper means and adapted to selectively pivot one or the other of the flapper means relative to said nozzle means to open and close selectively said inlet and exhaust passages to said chamber; a bimetal mounted on said casing; lever means connected to and movable by said bimetal; means connecting said lever means to said shaft to position said shaft in accordance with movement of said bimetal; bellows feedback means positioned in part in said chamber and engaging said lever means to apply a force to said lever means; second lever means positioned within said chamber and pivotally connected to said casing; second spring means positioned between said second lever means and each of said flapper means; said first and second spring means for each flapper means cooperating therewith to offset the force applied by the pressures at said inlet, exhaust and branch passages to produce a predetermined force difference on the respective flapper means; means connecting said bellows means to said second lever means to vary the loading of said first and second spring means associated with said flapper means with variation in branch line pressure within said chamber to maintain said predetermined force difference on each of said flapper means; and pressure responsive means positioned in said inlet passage and connected to said first spring means under said flapper means at said inlet passage, said pressure responsive means being responsive to inlet pressures and adapted to change the bias of said spring means connected thereto.

12. A pneumatic non-bleed thermostat comprising: a casing having a pressure chamber therein; inlet, exhaust and branch line passages positioned within said casing; nozzle means positioned in said inlet and exhaust passages adjacent said chamber; flapper means associated with said nozzle means; an operating shaft movably mounted within said chamber of said casing, said shaft engaging said flapper means and adapted to selectively pivot one or the other of the flapper means relative to said nozzle means to open and close selectively said inlet and exhaust passages to said chamber; a bimetal mounted on said casing; lever means connected to and movable by said bimetal; means connecting said lever means to said shaft to position said shaft in accordance with movement of said bimetal, said connecting means including magnet means mounted on said shaft and said lever means; bellows feedback means positioned in part in said chamber and engaging said lever means to apply a force to said lever means; second lever means positioned within said chamber and pivotally connected to said casing; biasing means being applied to each of said flapper means to offset the force on said flapper means applied by the pressure of said inlet, exhaust and branch passages to produce a predetermined minimum force difference on said flapper means, said biasing means being connected in part to said second lever means; and means connecting said bellows means to said second lever means to vary the loading of said biasing means on said flapper means with a variation in branch line pressure within said chamber to maintain said predetermined force difference on said flapper means.

References Cited in the file of this patent

UNITED STATES PATENTS

| | | |
|---|---|---|
| 1,450,236 | Anderson et al. | Apr. 13, 1923 |
| 1,909,469 | Hubbard | May 16, 1933 |
| 2,013,766 | Sandvoss | Sept. 10, 1935 |
| 2,179,450 | Gorrie | Nov. 7, 1939 |
| 2,362,631 | Harris | Nov. 14, 1944 |